United States Patent Office 3,500,318
Patented Mar. 10, 1970

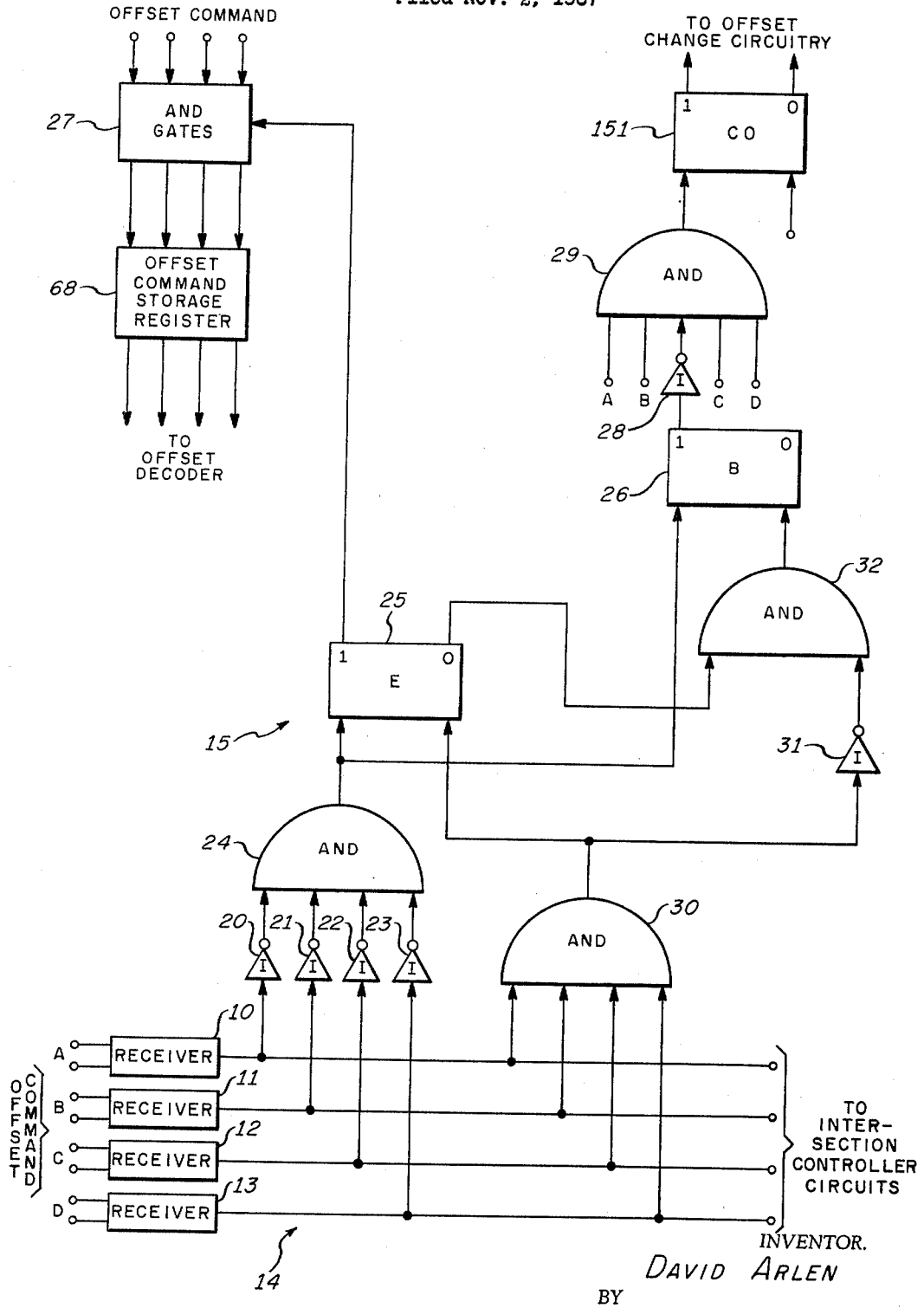

3,500,318
PLURAL COMMUNICATION CHANNEL TEST CIRCUIT
David Arlen, Jericho, N.Y., assignor to Sperry Rand Corporation, a corporation of Delaware
Filed Nov. 2, 1967, Ser. No. 680,175
Int. Cl. G06f 11/00; G08b 29/00
U.S. Cl. 340—146.1
4 Claims

ABSTRACT OF THE DISCLOSURE

A plural communication channel test circuit for testing plural binary transmission channels by utilizing test signals representative of both possible states wherein one group of signals is representative of a failure condition and the other group of signals is representative of a normal operating condition.

BACKGROUND OF THE INVENTION

Field of the invention

The present invention pertains to a test circuit for plural channel binary communication systems.

Description of the prior art

In vehicular traffic intersection controllers, for example, of the type disclosed in U.S. patent application S.N. 453,072 entitled "Traffic Intersection and Other Signal Controllers Responsive to a Cyclic Pulse Train," of John J. King, filed May 4, 1965, and now abandoned, as utilized in a traffic control system of the type disclosed in the U.S. patent application S.N. 452,974 entitled "Control System for Controlling Vehicular Traffic Flow or Other Moving Elements," filed May 4, 1965, and now abandoned, in the names of Giulianelli et al., each traffic intersection controller receives its offset command information from four sets of communication lines. Each set provides an offset command signal, such as A, B, C or D in the form of binary bits. As explained in said U.S. patent application S.N. 453,072, each intersection controller is capable of responding to nine operating offset commands, an offset change command and a standby offset command. Thus, only eleven combinations of the sixteen possible combinations utilizing the four offset bits are utilized. The five remaining offset bit combinations are unrecognizable commands with respect to the functioning of the intersection controller. The response of an intersection controller to one of the unrecognizable commands would be to continuously provide the right-of-way to the major traffic phase.

In the event there is a failure wherein all four offset signals fail thereby providing binary ZERO signals on all the offset lines, the intersection controller responds to this signal by placing the intersection controller in a standby mode of operation wherein the traffic control signals are generated internally within the intersection controller. However, for certain combinations of failures on the individual communication lines, the offset command presented to an intersection controller could be one of the unrecognizable commands thus causing a continuous right-of-way signal on the major phase. There are other combinations of failures on the communication lines which could present an offset command to the intersection controller different from the one being generated at the master site, thus creating a system control problem whereby coordination with the master site is lost. Another possibility is that although the offset command lines themselves are satisfactory, the line transmitters at the master site may have failed which could also cause the problems explained above.

The aforementioned problems of the unrecognizable commands could be solved by adding additional equipment to each of the intersection controllers in order that internally they would be capable of recognizing and discarding the additional offset combinations. However, the additional structure required to do this is relatively complex and considerably more cumbersome than the circuitry of the present invention.

SUMMARY OF THE INVENTION

The present invention solves the above problems with a minimum of additional equipment by exercising the four offset communication lines once for every background cycle. The exercise consists of a test pattern which generates the two possible binary states (1 or 0) on each offset line. This pattern assures that the offset communication lines can carry both binary signals and that the master site is capable of transmitting them. The function of the first bit is to arm the test circuit of the present invention in the intersection controller while the second bit disarms the test circuit.

BRIEF DESCRIPTION OF THE DRAWING

The single figure of the drawing is a schematic diagram of a plural communication channel test circuit incorporating the present invention.

DESCRIPTION OF THE PREFERRED EMBODIMENT

Referring to the drawing, four pairs of communication lines from the master site provide binary offset command signals indicated as A, B, C, D to respective receivers 10, 11, 12 and 13 in an intersection controller 14. The offset communication lines are exercised once each background cycle by means of a test pattern called the cycle code word. In the operation of the system described in said U.S. patent application S.N. 452,974, the cycle code word is transmitted down the communication lines at approximately 10% after the background start signal. Starting from the background start signal, the intersection controller 14 receives the operating offset command up and until the cycle code word time. The test pattern of the cycle code word consists of binary ZEROES followed by binary ONES on all the communication lines. All four offset communication lines are set simultaneously to their binary ZERO state for about 5% of the cycle and the four lines are then set simultaneously to their binary ONE state for about 5% of the cycle. Finally, the operating offset command is placed back on the communication lines and transmitted to the intersection controllers.

The function of the first simultaneous ZERO bit of the cycle code word is to arm the test circuit, generally indicated at 15, in the intersection controller 14 while the second simultaneous ONE bits disarm the circuit 15. The offset line receivers 10, 11, 12 and 13 are designed so that a communication line failure is equivalent to a ZERO signal. The all ZERO signal was chosen as the first bit in the cycle code word since this signal represents a communication line failure on all four communication lines. When the test circuit 15 is armed, a failure signal is generated which will be gated, in a manner to be explained, into the intersection controller offset circuitry at the next background start signal. At the background start signal, the failure signal will set the intersection controller into the standby offset mode wherein the standby offset will be selected, as explained more fully in said U.S. Patent application S.N. 453,072. The failure signal also locks out the offset command signals appearing on the input offset command lines from the master site. Thus there exists a permissive period of almost a background cycle for the system to disarm the test circuit 15.

Once in the standby offset mode, the intersection controller can only be removed from this mode by receiving the second simultaneous ONE bits of the cycle code word. Since the second simultaneous ONE bits of the cycle code word are also the same signals that are used to command an offset change, as explained in said U.S. patent application S.N. 453,072, a BLANK signal is generated by the test circuit 15 to prevent the offset change control circuitry from being armed every background cycle. The BLANK signal blanks or voids the input to the offset change circuitry, in a manner to be explained. The BLANK signal is generated at the beginning of the cycle code word and lasts until the end of the cycle code word thereby overlapping the second ONE bit of the cycle code word.

At the start of the transmission of the cycle code word, the first ZERO bit signals appear simultaneously at the output of the receivers 10, 11, 12 and 13 and after being inverted by respective inverters 20, 21, 22, and 23, the simultaneous signals appearing on the input terminals of an AND gate 24 enables it. The output of the AND gate 24 is connected to the set input terminals of E and B flip-flops 25 and 26, respectively. The E flip-flop 25 is the failure memory and when set, it generates a failure signal representative of a binary ONE which is connected to AND gates 27 to tend to initiate standby offset operation. As explained in said U.S. patent application S.N. 453,072, the AND gates 27 are responsive to offset command signals A, B, C, D and provide output signals to an offset command storage register 68 which is similarly numbered in FIG. 1a of said U.S. patent application S.N. 453,072.

The output of the AND gate 24 also sets the B flip-flop 26 to provide a BLANK signal from its binary ONE output which is inverted in an inverter circuit 28 and then connected to an input terminal of an AND gate 29. The other input terminals of the AND gate 29 are responsive to offset command signals A, B, C, D and when they are all ONES, it indicates an offset change command that is transmitted to a C.O. flip-flop 151 which is similarly numbered in FIG. 2 of said U.S. patent application S.N. 453,072 to initiate offset change operation, in a manner more fully explained in said application. The BLANK signal generated in the B flip-flop 26 prevents the all ONES test signal from being effective to initiate the offset change mode of operation.

The second bit of the test signal constituting all ONES is now transmitted down the communication lines and enables an AND gate 30 which provides an output to the reset terminal of the E flip-flop 25. This resets the E flip-flop 25 thereby removing the standby offset operation signal from the AND gates 27 and permits the offset command storage register 68 to be responsive to the forthcoming offset command signals A, B, C, D via the AND gates 27. The output of the AND gate 30 is also connected through an inverter circuit 31 to an input terminal of an AND gate 32 which has its other input terminal responsive to the reset signal from the output of the E flip-flop 25.

The test signal is removed and the operating offset command is placed back on the communication lines and transmitted to the intersection controllers. The AND gate 30 is disabled and through the inverter circuit 31 enables AND gate 32. The AND gate 32 provides an output signal to the reset input terminal of the B flip-flop 26. This resets the B flip-flop 26 thereby providing a binary ZERO output signal from the set output terminal of the flip-flop 26. This signal when inverted in the inverter 28 provides a binary ONE signal to the input terminal of the AND gate 29 which may then respond to a subsequent offset change command signal comprising all ONES for the A, B, C, D signals. This completes the operation of the test circuit 15 which has gone through the steps of being armed and disarmed to test the communication lines and master site equipment.

While the invention has been described in its preferred embodiment, it is to be understood that the words which have been used are words of description rather than limitation and that changes within the purview of the appended claims may be made without departing from the true scope and spirit of the invention in its broader aspects.

What I claim is:

1. A plural communication channel test circuit comprising
   a plurality of communication lines adapted to be responsive to binary ZERO and binary ONE command signals,
   first gating means responsive to simultaneous binary ZERO signals from said communication lines for providing a first signal,
   second gating means responsive to simultaneous binary ONE signals from said communication lines for providing a second signal and to other than said simultaneous binary ONE signals for providing a third signal,
   first flip-flop means having its set and reset input terminals responsive to said first and second signals respectively for providing an arming signal in response to said first signal and a disarming signal in response to said second signal,
   third gating means responsive to said third signal and said disarming signal for providing a fourth signal when both are present, and
   second flip-flop means having its set and reset input terminals responsive to said first and fourth signals respectively for providing an inhibiting signal in response to said first signal and an enabling signal in response to said fourth signal.

2. A circuit of the character recited in claim 1 and further including
   fourth gating means responsive to said arming signal for initiating an armed mode for the duration of said arming signal, and
   fifth gating means responsive to said inhibiting and enabling signals for selectively inhibiting and enabling for the duration of the respective signals.

3. A circuit of the character recited in claim 2 in which said simultaneous binary ZERO signals represent a failure condition, said simultaneous binary ONE signals represent a change command, and certain combinations of binary ZERO and ONE signals represent operating commands, wherein said fourth gating means is further responsive to said binary ZERO and ONE signals and said arming signal prevents said binary ZERO and ONE signals from being effective through said fourth gating means for the duration of said arming signal, and said fifth gating means is further responsive to said binary ZERO and ONE signals and said inhibiting signal prevents said binary ZERO and ONE signals from being effective through said fifth gating means for the duration of said inhibiting signal.

4. A circuit of the character recited in claim 3 in which said inhibiting signal extends beyond the duration of said arming signal.

References Cited

UNITED STATES PATENTS 3,257,546   6/1966   McGovern _____ 235—153
3,420,991   1/1969   Ling _____ 340—146.1 X MALCOLM A. MORRISON, Primary Examiner C. E. ATKINSON, Assistant Examiner U.S. Cl. X.R.

235—153; 340—22